Jan. 28, 1958     L. G. GITZENDANNER     2,821,684
NOISE ELIMINATION SYSTEM FOR CAPACITIVE SCANNING APPARATUS
Filed July 25, 1949
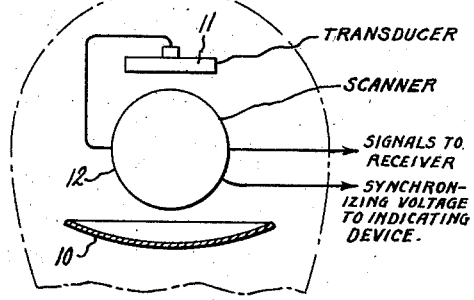
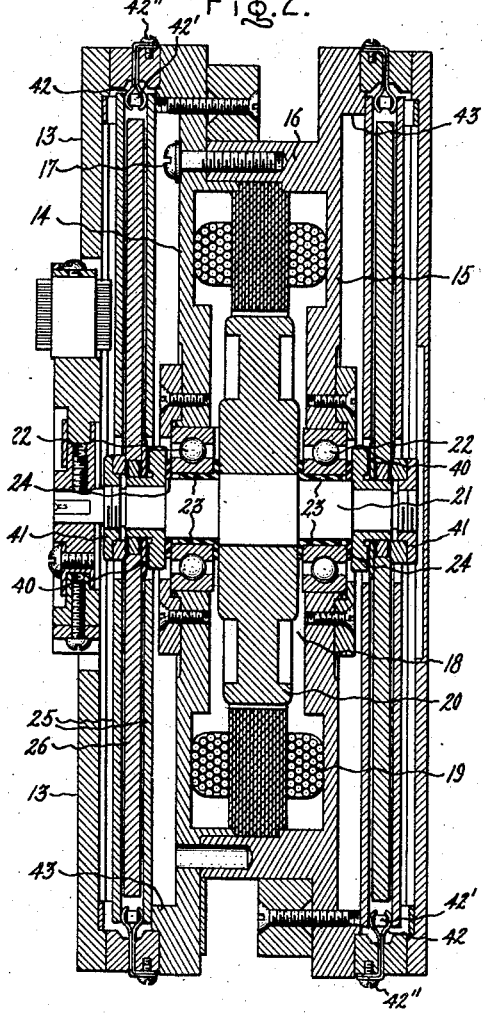
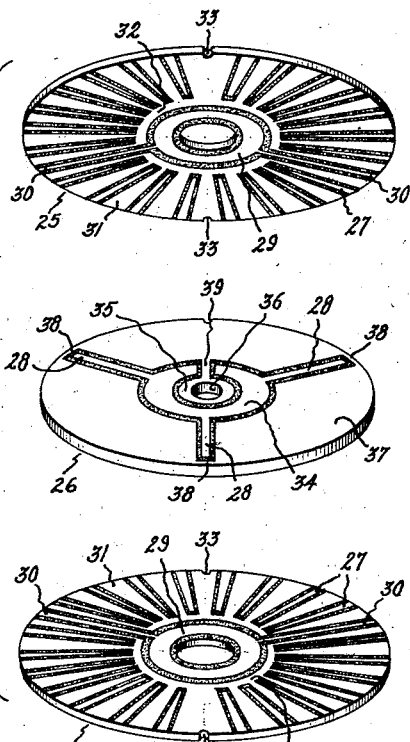
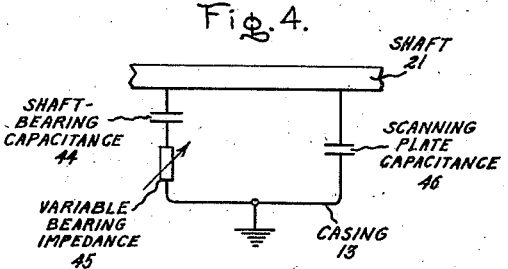
Inventor:
Louis G. Gitzendanner,
by Richard E. Hosley
His Attorney.

United States Patent Office 2,821,684
Patented Jan. 28, 1958

2,821,684

NOISE ELIMINATION SYSTEM FOR CAPACITIVE SCANNING APPARATUS

Louis G. Gitzendanner, Schenectady, N. Y., assignor to General Electric Company, a corporation of New York Application July 25, 1949, Serial No. 106,631

4 Claims. (Cl. 333—24)

My invention relates to electrostatic apparatus for scanning a plurality of electric signal sources and is an improvement upon the invention disclosed and claimed in application Serial Number 619,725, filed on October 1, 1945, in the names of Robert B. Crandell, Henry C. Maulshagen and Billy R. Shepard, and assigned to the same assignee as the present invention.

In electrostatic scanning apparatus such as that disclosed in the above Crandell et al. application a motor is employed to rotate one of a pair of scanning members relative to the other thereof. It has been found, however, that small electrical potentials are developed across the bearing members of the motor. The rotating bearings present a variable impedance to these potentials and introduce electrical noise into the scanned signals. Because of the relatively weak signals that commonly are scanned, it is essential that all such spurious noise be minimized.

Devices which have heretofore been employed in an attempt to minimize this bearing noise have primarily consisted of attempts to ground the motor shaft. Such grounding devices, however, have not been able to eliminate the noise for any length of time primarily because they, like the bearing members, soon became variable grounding impedances due to wear, accumulation of dirt and other causes. Mercury pools secured to the shaft, for example, soon became noisy due to the products of oxidation and amalgamation and had to be replaced. Various brush and slip ring arrangements for grounding the shaft also produced electrical noise since they also presented a variable grounding impedance and seemed to develop electrostatic charges themselves.

Accordingly, a principal object of my invention is to provide improved means for minimizing electrical noise produced by the bearing members of a motor in an electrostatic scanning system of the type described and claimed in the above mentioned Crandell et al. application.

Another object of my invention is to provide a bearing noise elimination system for the above type electrostatic scanning apparatus which requires a minimum of additional equipment.

In general my invention comprises a bearing member maintained out of electrically conductive contact with the motor drive shaft, and capacitive means connected from the drive shaft across the bearing member to provide a substantially constant low impedance path for any differences of potential developed at the rotating shaft due to the variable impedance presented by the moving parts of the bearing member.

The novel features which I believe to be characteristic of my invention are set forth with particularity in the appended claims. My invention itself, however, together with further objects and advantages thereof can best be understood by the following description taken in connection with the accompanying drawing in which Fig. 1 represents diagrammatically a signal receiving apparatus utilizing a scanning device embodying my invention; Fig. 2 is a detailed sectional view of the interior of the scanning device of Fig. 1; Fig. 3 is an exploded perspective view of the scanning plates employed in the device of Fig. 1, and Fig. 4 is an equivalent circuit diagram of the noise elimination network employed therein.

Referring to Fig. 1, I have diagrammatically illustrated a compressional wave receiving apparatus of the type employed in under-water object locating systems and comprising a parabolic reflector 10, a transducer 11 and a scanner 12. The transducer 11 is arranged in front of the reflector 10 and is provided with a line of piezoelectric crystal receiving elements extending approximately along the focal curve of the reflector. Each of the crystals are located to receive an incident compressional wave from a particular angle of declination within a volume of water under examination. By successively and rapidly scanning the signals produced by each crystal element, information as to the compressional wave pattern produced within this entire volume can be obtained. The motor driven electrostatic scanner 12 accomplishes this scanning function. Each of the crystals is connected by a separate conductor to the scanner which delivers the signals from the crystals to a conventional receiver network. Means are also provided within the scanner for producing a synchronizing voltage which may be employed to correlate the position of the scanner with respect to the particular crystal element supplying a signal to the receiver at a given instant of time. These signals and synchronizing voltage may be applied to a proper signal indicating device such as an oscilloscope (not shown).

The construction of the scanner 12 is shown in Fig. 2. A metal casing 13 comprises two parallel cylinders 14 and 15 spaced apart by an annular flange 16 extending from cylinder 15 and secured to the adjacent end wall of cylinder 14 by such means as screws 17. A motor 18, including a stator 19 and a rotor 20 secured to a motor drive shaft 21, is mounted between cylinders 14 and 15 within the space defined by the annular flange 16. A pair of bearing members 22, preferably of the ball bearing type as illustrated, are secured within the adjacent end walls of cylinders 14 and 15 respectively and function to journal the shaft 21.

For the proper operation of my invention, it is essential that the drive shaft 21 be kept out of electrically conductive contact with the bearing members 22. Insulating means, such as flanged bushings 23 and washers 24, composed of suitable electric insulating material, are therefore interposed between the shaft 21 and the bearing members 22. Due to the proximity between the shaft 21 and the bearings 22, these members also function as a small electrical capacitor and provide a path for variations of electrical potential as will be more fully explained hereinafter.

Two similar scanning assemblies, one for high frequency and one for low frequency, are mounted within the cylinders 14 and 15 respectively; and are arranged to be employed with two different lines of crystal elements in the transducer 11. These scanning assemblies are of similar construction and corresponding parts have been designated by the same numerals. Each of the scanning assemblies includes a pair of stationary members or plates 25 disposed on either side of a rotatable member or plate 26. These plates 25 and 26 are preferably constructed of glass, mycalex, or other suitable hard insulating material.

The details of construction of these plates are illustrated in Fig. 3. A plurality of pairs of conducting elemens or fingers designated generally by the numeral 27 are provided on the stationary plates 25. Each of these pairs of elements is connected by suitable electrical conduits (not shown) to an individual crystal in the transducer 11. The rotatable plate 26 is also provided on both sides with conducting elements, such as the three conducting arms 28 which pass between the pairs of elements 27 on the stationary plates 25 and cooperate therewith to couple the signal from each corresponding crystal capacitively to the receiver. The signal conducting elements 27 and 28 may be formed on the plates 25, 26 respectively by any suitable method providing a durable and smooth electrically conducting coating. Although only one side of the rotating plate 26 is illustrated in Fig. 3, it will be appreciated that both sides are coated identically.

The stationary conducting elements or fingers 27 preferably extend radially inward from the edge of the plate 25 toward a central annular conducting plate or ring 29 which is spaced and insulated from the fingers 27. A pair of conducting arms 30 extend radially and are connected from this annular plate 29 to the edge of the stationary member 25.

The area between the conducting fingers 27 is also covered with electrically conductive material to form conducting surfaces or members 31 suitably insulated from the fingers themselves. These intermediate conducting areas or members 31 are preferably in mutual electrically conductive relation by virtue of connecting strips 32 passing between the inward end of fingers 27 and the annular plate 29 and provide equipotential areas for purposes to be hereinafter explained. A pair of diametrically opposed locating notches 33 are preferably formed in the edge of each stationary member 25 adjacent corresponding intermediate areas 31 to facilitate the proper mounting of the stationary members within the scanner.

The rotating signal conducting elements or arms 28 on the rotating member 26 extend outward radially from a pair of central annular plates or rings 34 formed on opposite sides thereof and constructed to face the complimentary rings 29 of the stationary members 25. The annular plates 34 are, in turn, spaced and insulated from an inner conducting ring 35 which has a central aperture 36 of a diameter constructed to encircle closely the shaft 21. The areas between the conducting fingers 28 on opposite sides of the rotating plate 26 are also electrically conductive, preferably by virtue of an electrically conductive coating, to form intermediate conducting areas 37 that are separated and insulated from the fingers 28 and the annular plates 34. These conductive areas 37 are interconnected by strips 38 of conducting material at the edge of the plate 26 beyond the ends of fingers 28, and are also connected to the inner conductive ring 35 by a strip 39 extending through an open gap in ring 34.

The construction of the above described scanning members 25 and 26 as well as the actual signal scanning procedure is more fully described and is claimed in application Serial No. 619,716, filed on October 1, 1945, by myself and Charles J. Falk jointly, and assigned to the same assignee as the present invention.

Each of the rotatable scanning members 26 is fastened to the shaft 21 by a conducting washer 40 and a nut 41 which makes both mechanical and electrical connection between the inner conducting ring 35 of the rotating member 26 and the shaft 21. The stationary scanning members 25 are located in a proper position on either side of the respective rotatable scanning members 26 by rods (not shown) which extend from annular shoulders 43 of cylinders 14 and 15 respectively and fit within the notches 33 formed in the stationary plates 25. In order to make an electrical connection between the intermediate conducting areas 31 of the stationary plates 25 and the casing 13 a plurality of bifurcated connecting clips 42 are preferably employed. The prongs of these clips surround an insulating spacing ring 42' and press against oppositely facing intermediate conducting members 31 on the stationary plates 25. The body of the clips 42 are secured to casing 13 by such means as screws 42". Similar clips (not shown) which are insulated from the casing 13 make the necessary connections to the conducting elements 27 of the stationary members 25 and insure a proper spacing between the cooperating scanning members 25 and 26.

Referring now to Fig. 4 I have shown an equivalent circuit diagram explanatory of the bearing noise elimination resulting from my invention. The electrically conducting casing 13 comprising cylinders 14 and 15 may be considered as a common reference point or may be actually connected to ground as indicated. By virtue of the insulating bushing 23, the insulating washer 24 and the spacing between the rotatable and stationary scanning members 25 and 26, the shaft 21 is maintained in an ungrounded condition out of electrically conductive contact with the casing 13. Due to the proximity of the inner portion of the bearing members 22 to the shaft 21, however, a small amount of capacitance, represented by a capacitor 44, exists therebetween. When the shaft is rotating, a variation of the electrical impedance presented by each bearing member 22 results which is believed to be caused by non-uniformity of the relatively rotating surfaces of the bearing member, and by the formation of a thin oil or grease film which insulates the bearing parts but breaks down intermittently during bearing rotation. This varying electrical impedance of the bearing members 22, is diagrammatically designated in Fig. 4 as a non-linear impedance 45.

Furthermore, due to the proximity of the signal conducting elements 27, 28, 33 and 34 to the shaft 21, spurious signals are electrostatically coupled to the shaft 21. If these signals are not provided with an immediate low impedance path to ground they are reflected into the scanning system as unwanted noise. In order to provide this low impedance by-pass path to ground, I have utilized the conducting areas 31 and 37 on the scanning members 25 and 26 respectively intermediate the signal carrying elements 27 and 28. As formerly connected, all of the intermediate areas 31 and 37 both on the rotating scanning members 26 and on the stationary scanning members 25, as well as the shaft 21 itself, were directly connected to the grounded casing in an attempt to reduce stray capacity effects. In the present invention, the intermediate areas 37 of the rotating scanning members 26 are directly connected only to the ungrounded shaft 21, while the intermediate areas 31 of the stationary members 25 are directly connected to the grounded casing 13. Together, these intermediate areas 31 and 37 function as a fairly large capacitance 46 connected as indicated in Fig. 4 between the shaft 21 and the grounded casing 13. This capacitance 46 is, of course, much larger than the capacitance 44 existing between the bearing assembly 22 and the drive shaft 21. It is apparent therefore, that the impedance of the path to ground comprising the capacitance 44 and the non-linear impedance 45 of the bearing members 22 is much greater than the impedance of the path comprising capacitor 46; with the consequence that any spurious potentials electrostatically coupled to the shaft 21 are immediately by-passed to ground through the capacitance existing between the adjacent intermediate areas 31 and 37 of the scanning members 25 and 26. Any variations in the impedance of the bearing members will, therefore, cause little or no accumulation of electrical charge and no appreciable reflections of spurious electrical bearing noise into the scanning system will result.

It will be appreciated that by employing the intermediate areas on the scanning members 25 and 26 as the low impedance by-pass capacitance to ground, I also eliminate the necessity of additional equipment and thereby permit the same compact construction and ease of assembly as has heretofore been employed.

While the present invention has been described by reference to particular embodiments thereof, it will be understood that numerous modifications may be made by those skilled in the art and I, therefore, intend by the appended claims to cover all such equivalent variations as come within the true spirit and scope of my invention.

What I claim as new and desire to secure by Letters Patent of the United States is:

1. In a scanning apparatus of the capacitive coupling type, a pair of proximately located scanning members, a motor having at least one bearing member and having a driving shaft journaled in said bearing member out of electrically conductive relation therewith, said shaft being connected to at least one of said scanning members for the relative spaced rotation of said scanning members, and electrically conducting members covering a substantial portion of the adjacent surfaces of each of said relatively rotatable scanning members, said conducting members of one of said pair of scanning members being electrically connected to said shaft, said conducting members of the other of said scanning members being electrically connected to said bearing member to provide a low impedance capacitive path across said bearing member for electrical noise electrostatically coupled to said shaft.

2. In a scanning apparatus of the capacitive coupling type, the combination comprising a pair of proximately located scanning members, a motor having at least one bearing member and having an electric conducting driving shaft journaled in said bearing member out of electrically conductive relation therewith, said shaft being connected for the rotation of one of said scanning members in spaced relation to the other thereof, the adjacent facing surfaces of each of said scanning members having electrically conducting surface areas, electric conducting means connecting said rotatable scanning member conducting surface area to said driving shaft, and electric conducting means connecting said stationary scanning member conducting surface areas to said bearing member thereby to provide a low impedance capacitive path for electrical bearing noise electrostatically coupled to said shaft.

3. In a scanning apparatus of the capacitive coupling type, the combination comprising a pair of proximately located scanning plates, a motor having at least one bearing member and having a driving shaft journaled in said bearing member, said driving member being mechanically connected to one of said scanning plates for the spaced rotation thereof relative to the other of said scanning members, insulating means interposed between said driving shaft and said bearing member to maintain said shaft out of electrically conductive relation with said bearing members, a plurality of spaced conducting elements on the adjacent facing surface of each of said pair of scanning plates, said adjacent facing surfaces having electrically conductive members intermediate said spaced conducting elements, electrical conducting means connecting said intermediate conductive members of said rotatable scanning plate to said driving shaft, and electrical conducting means connecting said intermediate conducting members of said stationary scanning plate to said bearing member thereby to provide a low impedance path for electrical bearing noise electrostatically coupled to said scanning plates.

4. In a scanning apparatus of the capacitive coupling type, a metallic casing, a motor within said casing having at least one bearing member secured to said casing, a driving shaft operated by said motor and journaled in said bearing member, insulating means interposed between said shaft and said bearing member to maintain said shaft out of electrically conductive relation with said casing, at least one pair of proximately located scanning plates, one of said pair of scanning plates being mechanically connected to said shaft for the spaced rotation thereof relative to the other of said scanning plates, a plurality of spaced conducting fingers on the adjacent facing surface of each of said scanning plates, electrically conductive members on said adjacent facing surfaces spaced from and intermediate said conducting fingers, electrical conducting means connecting said intermediate conducting members of said rotatable scanning plate to said shaft, and electrical conducting means connecting said intermediate conducting members of said stationary scanning plate to said casing thereby to provide a low impedance path to said casing for electrical bearing noise electrostatically coupled to said shaft.

References Cited in the file of this patent

UNITED STATES PATENTS

| | | |
|---|---|---|
| 1,671,143 | Campbell | May 29, 1928 |
| 2,014,228 | De Coutouly | Sept. 10, 1935 |
| 2,310,695 | Higgins | Feb. 9, 1943 |
| 2,477,635 | Marchand | Aug. 2, 1949 |